(12) United States Patent
Benson et al.

(10) Patent No.: US 7,204,133 B2
(45) Date of Patent: *Apr. 17, 2007

(54) METHOD AND APPARATUS FOR DETECTING COMBUSTION INSTABILITY IN CONTINUOUS COMBUSTION SYSTEMS

(75) Inventors: Kelly J. Benson, Fort Collins, CO (US); Luigi P. Tozzi, Fort Collins, CO (US); Ed Van Dyne, Loveland, CO (US); Jeff B. Barrett, Bolton, MA (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,317

(22) Filed: Aug. 31, 2005

(65) Prior Publication Data
US 2006/0000260 A1 Jan. 5, 2006

Related U.S. Application Data

(63) Continuation of application No. 10/411,167, filed on Apr. 10, 2003, now Pat. No. 6,993,960, which is a continuation-in-part of application No. 10/329,664, filed on Dec. 26, 2002, now Pat. No. 7,096,722.

(51) Int. Cl.
*G01M 15/00* (2006.01)
(52) U.S. Cl. .................................. 73/117.3; 73/35.08

(58) Field of Classification Search .............. 73/35.01, 73/35.03, 35.06, 35.07, 35.08, 116, 117.2, 73/117.3, 118.1
See application file for complete search history.

(56) References Cited

U.S. PATENT DOCUMENTS

| 4,186,701 A | 2/1980 | Suzuki et al. |
| 4,410,854 A | 10/1983 | Kroneisen et al. |
| 4,410,859 A | 10/1983 | Kuwahara et al. |

(Continued)

*Primary Examiner*—Eric S. McCall
(74) *Attorney, Agent, or Firm*—Reinhart Boerner Van Deuren P.C.

(57) ABSTRACT

An apparatus and method to sense the onset of combustion stability is presented. An electrode is positioned in a turbine combustion chamber such that the electrode is exposed to gases in the combustion chamber. The electrode may be integrated with an igniter. A control module applies a voltage potential to the electrode and detects a combustion ionization signal and determines if there is an oscillation in the combustion ionization signal indicative of the occurrence of combustion stability or the onset of combustion instability. The control module broadcasts a notice if the parameters indicate the combustion process is at the onset of combustion instability or broadcasts an alarm signal if the parameters indicate the combustion process is instable. Combustion parameters are adjusted to drive the combustion process towards stability.

16 Claims, 10 Drawing Sheets

U.S. PATENT DOCUMENTS

| | | |
|---|---|---|
| 4,426,987 A | 1/1984 | Latsch et al. |
| 4,444,172 A | 4/1984 | Sellmaier et al. |
| 4,447,204 A | 5/1984 | Isenberg |
| RE32,301 E | 12/1986 | Latsch et al. |
| 4,648,367 A | 3/1987 | Gillbrand et al. |
| 4,770,628 A | 9/1988 | Ohkura |
| 4,938,019 A | 7/1990 | Angell et al. |
| 5,073,753 A | 12/1991 | Collings et al. |
| 5,178,001 A | 1/1993 | Ikeuchi et al. |
| 5,263,851 A | 11/1993 | Hosome et al. |
| 5,925,819 A | 7/1999 | Yoshinaga et al. |
| 6,011,397 A | 1/2000 | Yasuda |
| 6,032,650 A | 3/2000 | Rask |
| 6,145,491 A | 11/2000 | Wilstermann et al. |
| 6,202,472 B1 | 3/2001 | Wezurek et al. |
| 6,425,371 B2 | 7/2002 | Majima |
| 6,429,020 B1 | 8/2002 | Thornton et al. |
| 6,505,500 B1 | 1/2003 | Elgh et al. |
| 6,739,181 B2 | 5/2004 | Honda |
| 6,742,499 B2 | 6/2004 | Viele et al. |
| 6,887,069 B1 | 5/2005 | Thornton et al. |
| 2003/0056517 A1 | 3/2003 | Brushwood et al. |

METHOD AND APPARATUS FOR DETECTING COMBUSTION INSTABILITY IN CONTINUOUS COMBUSTION SYSTEMS

CROSS-REFERENCE TO RELATED PATENT APPLICATIONS

This patent application is a continuation of U.S. Pat. No. 6,993,960, Ser. No. 10/411,167 filed Apr. 10, 2003, which is a continuation-in-part of U.S. Pat. No. 7,096,722, Ser. No. 10/329,664, filed Dec. 26, 2002.

FIELD OF THE INVENTION

The present invention relates generally to continuous combustion systems, and more particularly relates to such systems operating near the onset of combustion instability.

BACKGROUND OF THE INVENTION

Continuous combustion systems such as gas turbine engines are used in a variety of industries. These industries include transportation, electric power generation, and process industries. During operation, the continuous combustion system produces energy by combusting fuels such as propane, natural gas, diesel, kerosene, or jet fuel. One of the byproducts of the combustion process is emission of pollutants into the atmosphere. The levels of pollutant emissions are regulated by government agencies. Despite significant reductions in the quantity of environmentally harmful gases emitted into the atmosphere, emission levels of gases such as $NO_x$, $CO$, $CO_2$ and hydrocarbon (HC) are regulated by the government to increasingly lower levels and in an ever increasing number of industries.

Industry developed various methods to reduce emission levels. One method for gaseous fueled turbines is lean premix combustion. In lean premix combustion, the ratio between fuel and air is kept low (lean) and the fuel is premixed with air before the combustion process. The temperature is then kept low enough to limit the formation of nitrous oxides (which occurs primarily at temperatures above 1850 K). The premixing also decreases the possibility of localized fuel rich areas where carbon monoxides and unburnt hydrocarbons are not fully oxidized.

One of the more difficult challenges facing manufacturers of lean premix gas turbines and other continuous combustion systems is the phenomenon of combustion instability. Combustion instability is the result of unsteady heat release of the burning fuel and can produce destructive pressure oscillations or acoustic oscillations. In lean premix gas turbines, combustion instability can occur when the air-fuel ratio is near the lean flammability limit, which is where turbine emissions are minimized. In general, the air/fuel ratio of the premixed fuel flow should be as lean as possible to minimize combustion temperatures and reduce emissions. However, if the air/fuel ratio is too lean, the flame will become unstable and create pressure fluctuations. The typical manifestation of combustion instability is the fluctuation of combustion pressure sometimes occurring as low as +/−1 psi at frequencies ranging from a few hertz to a few hundred hertz. Depending on the magnitude and frequency, this oscillation can create an audible noise which is sometimes objectionable, but a much more serious effect can be catastrophic failure of turbine components due to high cycle fatigue. The most severe oscillations are those that excite the natural frequencies of the mechanical components in the combustion region, which greatly increases the magnitude of the mechanical stress.

Most continuous combustion systems are commissioned in the field with sufficient safety margin to avoid entering an operating regime where combustion instabilities can occur. However, as components wear out or fuel composition changes, the combustion process can still become unstable.

BRIEF SUMMARY OF THE INVENTION

The invention provides an apparatus and method to sense the presence of combustion instability, even at very low levels, so that an operator or a closed loop control system can take mitigating action to either restore combustion stability or shut down the combustion process (in the turbine or afterburner).

An ion sensor such as an electrode is positioned in the combustion chamber of a turbine combustion system at a location such that the sensor is exposed to gases in the combustion chamber, and in particular those gases containing free ions that are produced during combustion. A voltage is applied to the sensor to create an electric field from the sensor to a designated ground (e.g., a chamber wall) of the combustion chamber. The voltage is applied in one embodiment such that the electric field radiates from the sensor to the designated ground of the combustion chamber. If free ions are present in this field, a small ion current will flow. The magnitude of the ion current gives an indication of the density of ions. A control module detects and receives from the sensor a combustion ionization signal and determines if there is an oscillation in the combustion ionization signal indicative of the occurrence of combustion instability or the onset of combustion instability. This provides the ability to indirectly monitor pressure oscillations by inferring a pressure oscillation without requiring an expensive and unreliable pressure transducer to be installed in the field. The oscillation magnitude of the ion signal is correlated to a pressure oscillation magnitude and stored in the controller memory.

The control module applies a voltage to the ion sensor during the combustion process, measures the ion current flowing between the sensor and the designated ground of the combustion chamber, and compares the ionization current oscillation magnitude and oscillation frequency against predetermined parameters and broadcasts a signal if the oscillation magnitude and oscillation frequency are within a combustion instability range. The parameters include an oscillation frequency range and an oscillation magnitude.

The signal is broadcast to indicate combustion instability if the oscillation frequency is within a critical range for a given combustion system (e.g., the range of approximately 250 Hz to approximately 300 Hz for a critical frequency of 275 Hz) and/or the oscillation magnitude of pressure can be inferred from the ion signal to be above a first threshold relative to a steady state magnitude (e.g., ±2 psi). The signal is broadcast to indicate the onset of combustion instability if the oscillation frequency is within the critical range and/or the oscillation magnitude is above a second threshold relative to a steady state magnitude. In response to receiving the signal, a mitigating action is taken such as enriching the air/fuel ratio, adjusting the flow nozzle geometry, or other type of mitigating action.

These and other advantages of the invention, as well as additional inventive features, will be apparent from the description of the invention provided herein.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides a method and apparatus to sense combustion instability and/or the onset of combustion instability in a combustion region of a continuous combustion system such as a gas turbine, industrial burner, industrial boiler, or afterburner utilizing ionization signals. The invention may be used with any hydrocarbon fuels, such as liquid or gaseous fuels, that produce free ions in the flame when the fuel is burned. The magnitude of the free ions in the flame is proportional to the concentration of hydrocarbons, and therefore the measured ion current is also proportional to the magnitude of free ions. Oscillations in the flame produce oscillations in the hydrocarbons, which in turn, results in oscillations in the ionization signal. When those ion current oscillations have been properly correlated to pressure oscillations, the ion signal gives a very clear indication of the pressure oscillations. The oscillation of the ion signal is typically correlated in a laboratory environment with pressure oscillations as measured by a pressure transducer to properly interpret the magnitude of the ion signal oscillation to a corresponding pressure oscillation. The invention detects the frequency and magnitude of oscillations in the ionization signal and provides an indication when the frequency and magnitude of the ionization signal oscillation are above selected thresholds.

Figure 1:
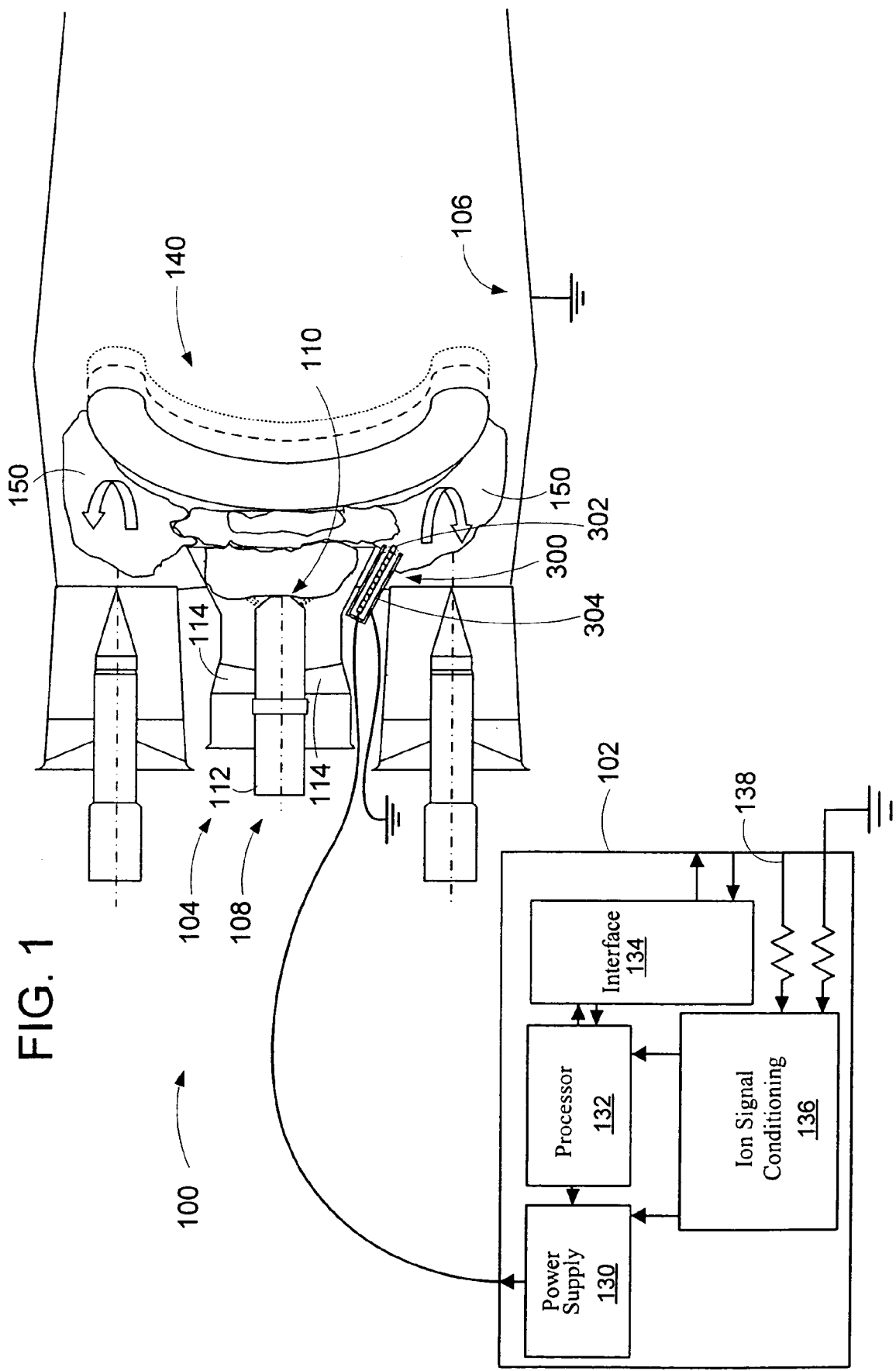
FIG. 1 is a diagram illustrating the components of the present invention in a portion of a turbine system where the ion sensor electrode is integral with an igniter.

Turning to the drawings, wherein like reference numerals refer to like elements, the invention is illustrated as being implemented in a suitable turbine environment. FIG. 1 illustrates an example of a suitable turbine environment 100 on which the invention may be implemented. The turbine environment 100 is only one example of a suitable turbine environment and is not intended to suggest any limitation as to the scope of use or functionality of the invention. For example, the invention may be implemented in an afterburner, industrial burner, industrial boiler, and the like. Neither should the turbine environment 100 be interpreted as having any dependency or requirement relating to any one or combination of components illustrated in the exemplary operating environment 100.

With reference to FIG. 1, an exemplary system for implementing the invention includes electronic module 102, fuel nozzle 104, and combustion chamber 106. The fuel nozzle 104 is mounted to the combustion chamber 106 using conventional means. The fuel nozzle 104 is typically made of conducting material and has an inlet section 108, an outlet port 110 that leads into combustion chamber 106 and a center body 112. An igniter is used to ignite the fuel mixture in the combustion region after the air and fuel are mixed in a pre-mix swirler 114. In afterburners, the air enters combustion chamber 106 through separate passages and a fuel nozzle passage is used to introduce fuel in the combustion chamber 106. The operation of the turbine is well known and need not be discussed herein.

The electronic module 102 may be a separate module, part of an ignition control module or part of an engine control module. The electronic module 102 includes a power supply 130 for providing a controlled ac or dc voltage signal to the electrode 302 when commanded by processor 132. Processor 132 commands the power supply to provide power to the electrode 302, receives ion current signals from electrode 302 via conditioning module 136, performs computational tasks required to analyze the ion signals to determine the onset of combustion instability and combustion instability, and communicates with other modules such as an engine control module through interface 134. Conditioning module 136 receives signals from the electrode 302 via lines 138 and performs any required filtering or amplification. The electrode 302 may be part of an igniter 300 or may be a separate ion sensor unit.

It should be noted that other types of ion current sensors may be used in accordance with the present invention. For example, the electrodes described in U.S. Pat. No. 6,429,020 and U.S. patent application Ser. No. 09/955,582 filed on Sep. 18, 2001, hereby incorporated by reference in their entireties, may be used. Additionally, the igniter of a gas turbine or industrial burner can be used to sense ion current in a similar manner as with spark plugs on reciprocating gas engines. The igniter is used for ignition only at startup and therefore is available the rest of the time for ion sensing and provides the advantage in that the igniter is already installed in the combustion chamber. An igniter can be mounted in a combustion chamber of a gas turbine or industrial burner in a variety of ways. For example, the igniter can be placed at a fixed location near the fuel nozzle (see FIG. 1), at a moving location with a retraction mechanism (see FIG. 2), integrated into the fuel nozzle (see FIG. 3), in a fixed location chosen not for ignition purposes but for ion sensing (see FIG. 4), and in a closed chamber for ignition purposes only with a separate fuel supply (not shown).

Turning back to FIG. 1, placement of the igniter 300 in the cooling air stream of the system allows the igniter to tolerate the high temperatures of the combustion chamber. It is also possible for the igniter 300 to be placed such that it is close enough to the flame 140 to sense the ion field 150 but far enough removed to avoid failure from high temperature. The ion current flows between the center electrode 302 of the igniter and the grounded case 304 of the igniter. The igniter 300 is connected to electronic module 102.

Figure 2:
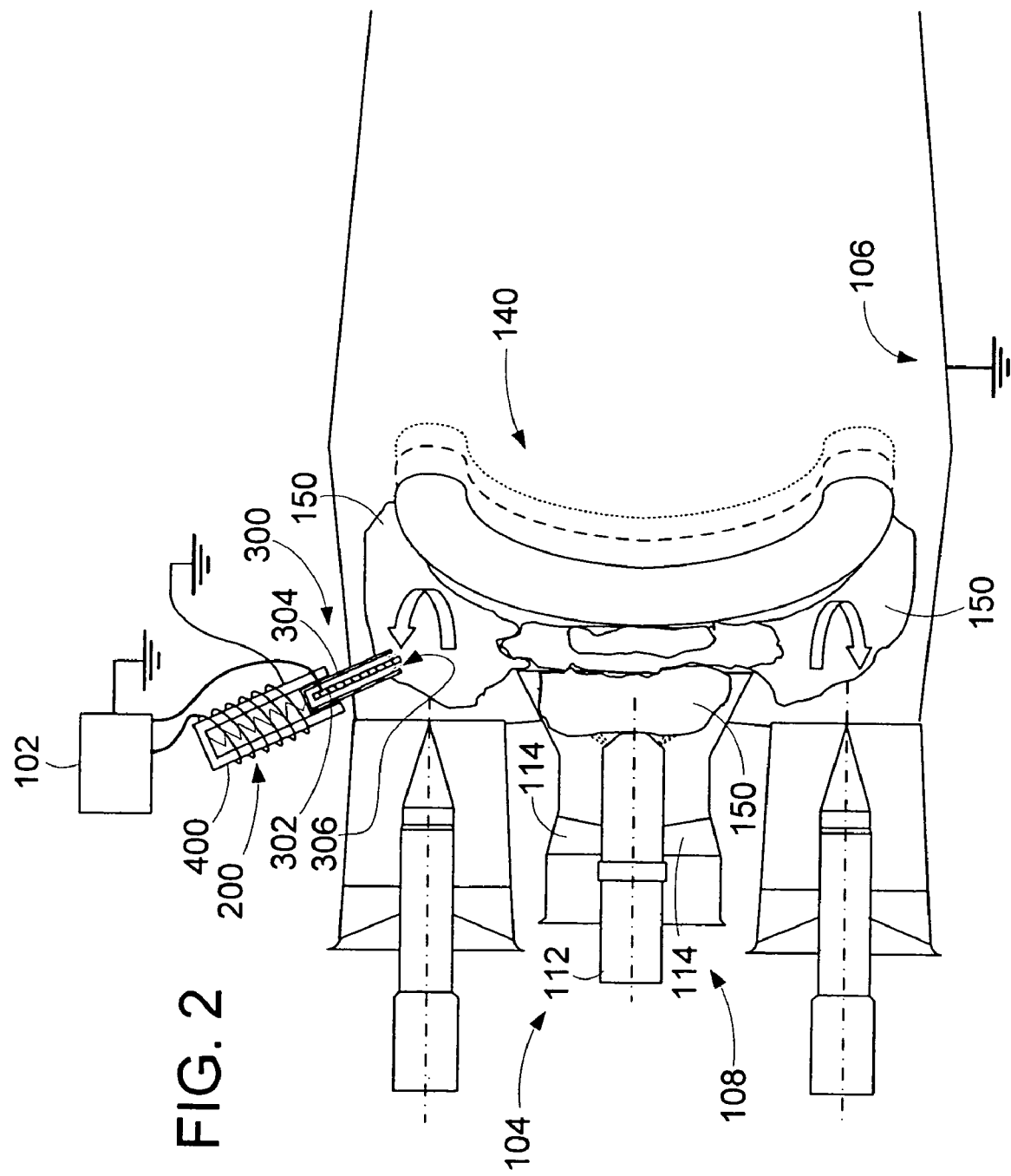
FIG. 2 is a diagram illustrating an ion sensor electrode in a retraction mechanism.

Turning now to FIG. 2, an alternate mounting arrangement for the igniter 300 is on a sliding retraction mechanism 400 that positions the igniter 300 in an ideal location for ignition but then retracts it when combustion pressure and temperature rise. The retraction mechanism 400 is common for large industrial turbines in that it keeps the igniter 300 safely away from the flame, and therefore out of the ion field 150. The electronic module (or a separate module) of the present invention controls the position of the retraction mechanism 400 to keep the tip 306 of the igniter 300 in the ion field 150 and away from the flame 140, maintaining a safe operating temperature of the igniter 300. A more complex arrangement may be necessary which actively positions the igniter 300 through a control loop such that it is always in a measurable ion field while monitoring the igniter temperature via a thermocouple or other temperature measuring device near the tip. The control loop may need to cycle the igniter 300 in and out to take ion measurements momentarily and then retract for a period of time to cool the igniter if the temperature of the igniter is above a threshold temperature or rapidly approaches a threshold temperature. This temperature control and actuator driver function may be added to electronic module 102 as illustrated in FIG. 2 as a solenoid controlled by coil 200 or as a stand-alone module.

Figure 3:
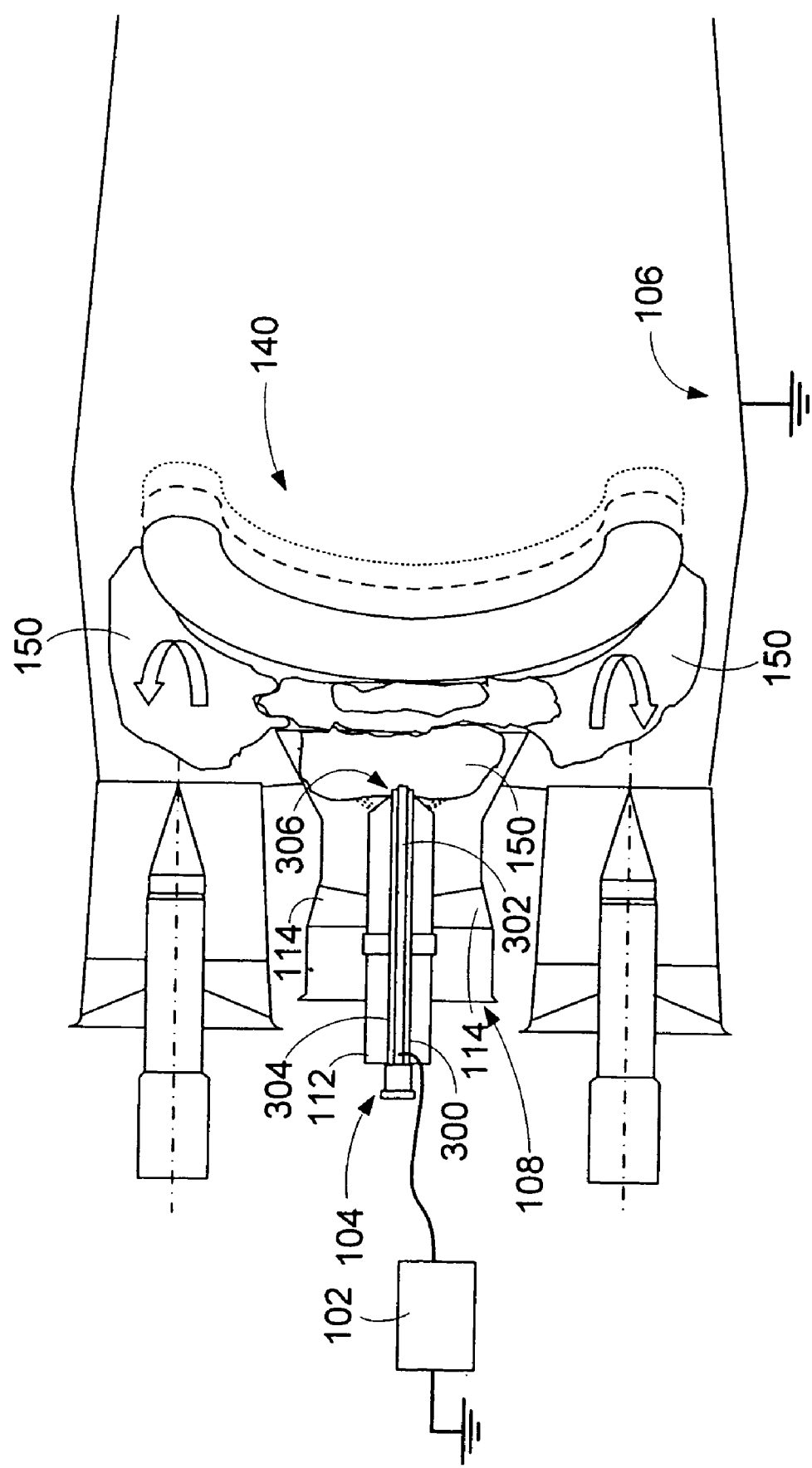
FIG. 3 is a diagram illustrating an ion sensor electrode in a fuel nozzle.
Figure 4:
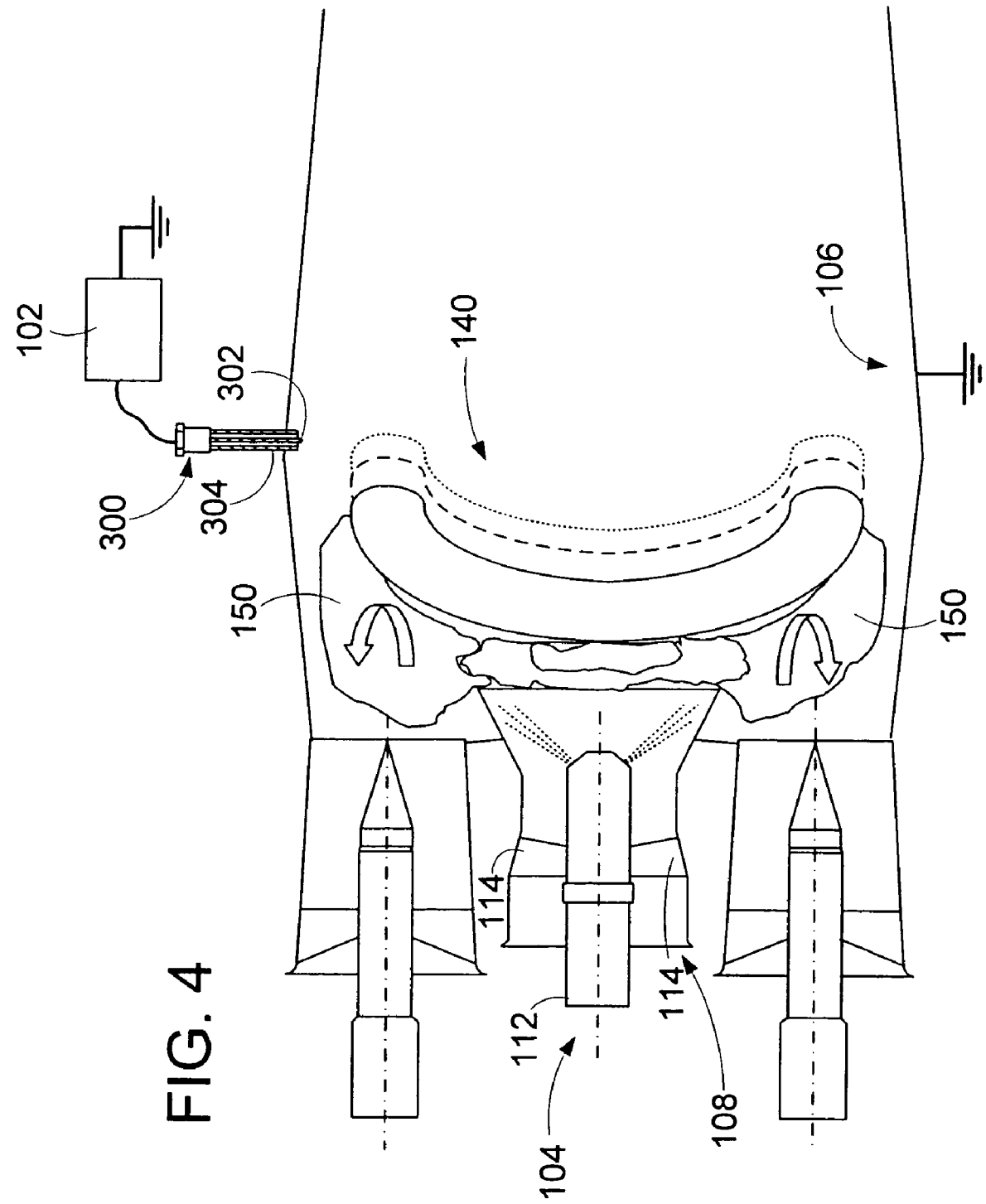
FIG. 4 is a diagram illustrating an igniter used solely as an ion sensor.

Turning now to FIG. 3, a further alternate mounting arrangement for the igniter is in the fuel nozzle at the discharge end next to the combustion chamber 106. The igniter 300 is placed in the fuel nozzle 104 such that cooling air or fuel flows around it and maintains a safe operating temperature. The igniter tip 306 is exposed to the combustion chamber and is capable of reaching an ignitable mixture with the ignition plasma as described in U.S. Pat. No. 4,938,019 to Angell et. al. An igniter in this position is capable of serving as an ion sensor after ignition has occurred. FIG. 4 illustrates a further embodiment where the igniter 300 is located in the combustion chamber 106 away from the fuel nozzle 104 at a location where ions may be present, but in smaller concentrations depending on flame conditions and location. In this embodiment, the igniter 300 is used only as an ion sensor to detect that the flame has moved away from the fuel nozzle by sensing an increase in the ion current flowing between the center electrode 302 and the grounded case 304. Additionally, other types of electrodes may be used that are capable of sensing ion current in continuous combustion systems. In the description that follows, the electrode 302 shall be used for the purpose of describing the operation of the invention. It is recognized that the electrodes described herein and other types of electrodes may be used with the invention.

Figure 5:
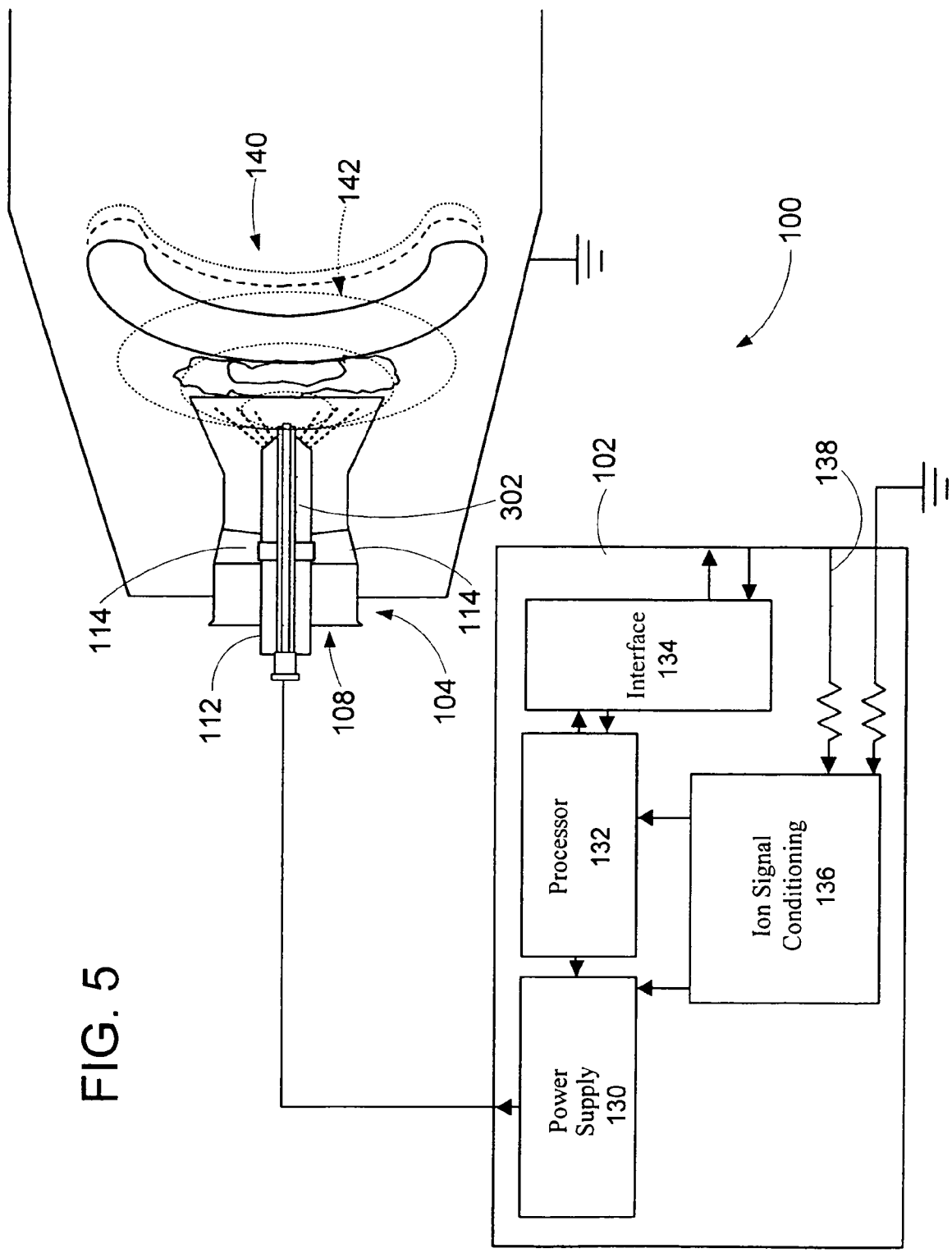
FIG. 5 is a diagram illustrating an ion sensor of the present invention in a system having combustion instability.
Figure 6:
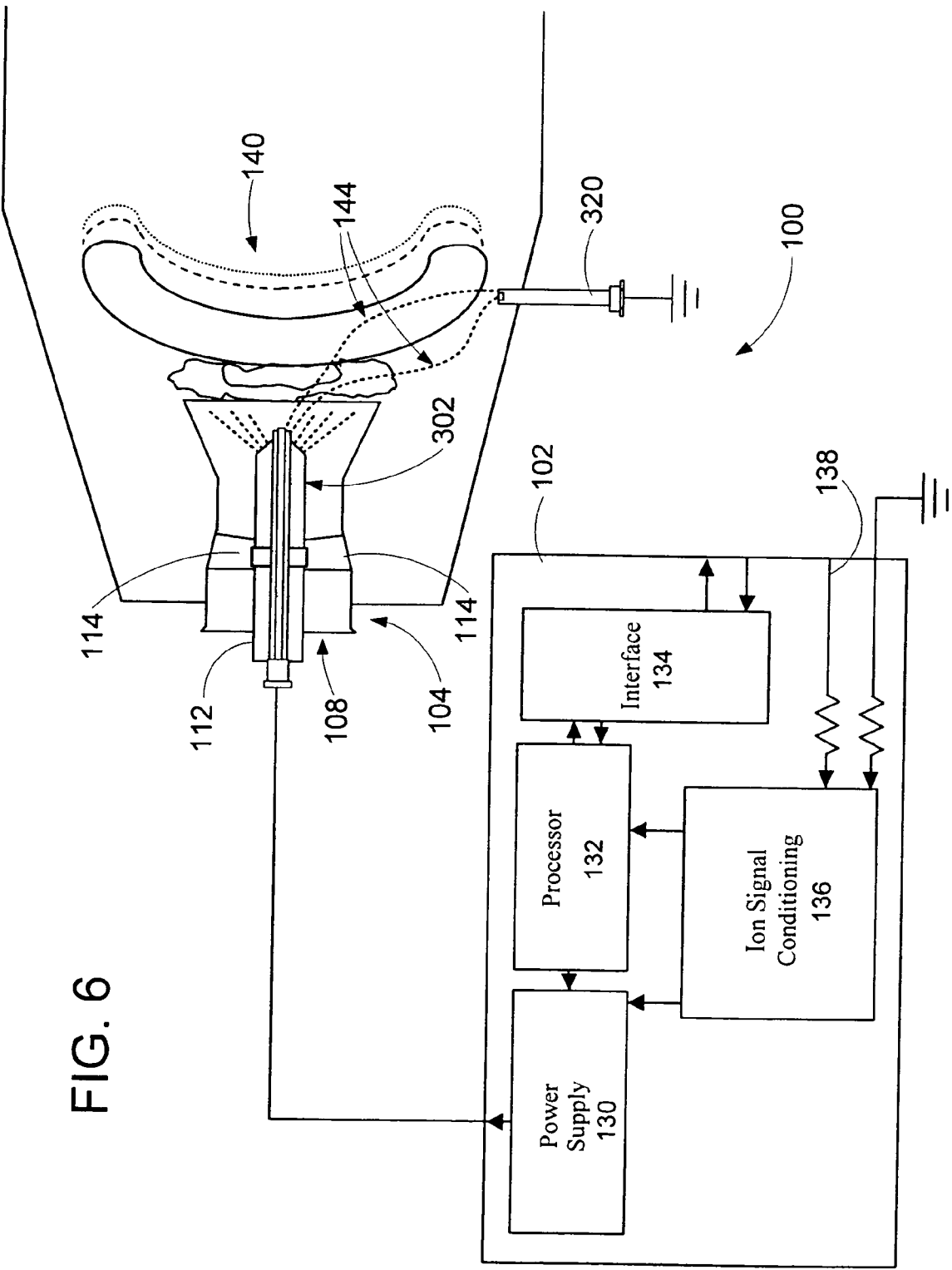
FIG. 6 is a diagram illustrating an ion sensor in accordance with the present invention in a system having combustion instability in a combustion chamber having electrically insulated walls.

Turning now to FIG. 5, during normal combustion, the flame 140 produces free ions and the electrode 302 will have an ion current flow when a voltage is applied to the electrode 302. Ion current will flow between the electrode 302 and ground (e.g., the chamber wall). The magnitude of the ion current flow will be in proportion to the concentration of free ions in the combustion process. When a voltage potential is applied to electrode 302, an electric field potential 142 is established between the electrode 302 and the remaining components in the combustion chamber. For combustion chambers having walls that are electrically insulated or are poorly grounded, a grounding strip is used to provide a return path to enhance the flow of ion current. For example, FIG. 6 shows a grounding strip 320 providing the return path for the ion current 144 to flow between the electrode 302 and ground. The term grounding strip as used herein means any connection that provides a return path to ground. For example, the grounding strip may be a ground plane, a conductive strap, a conductive strip, a terminal strip, etc.

Figure 7:
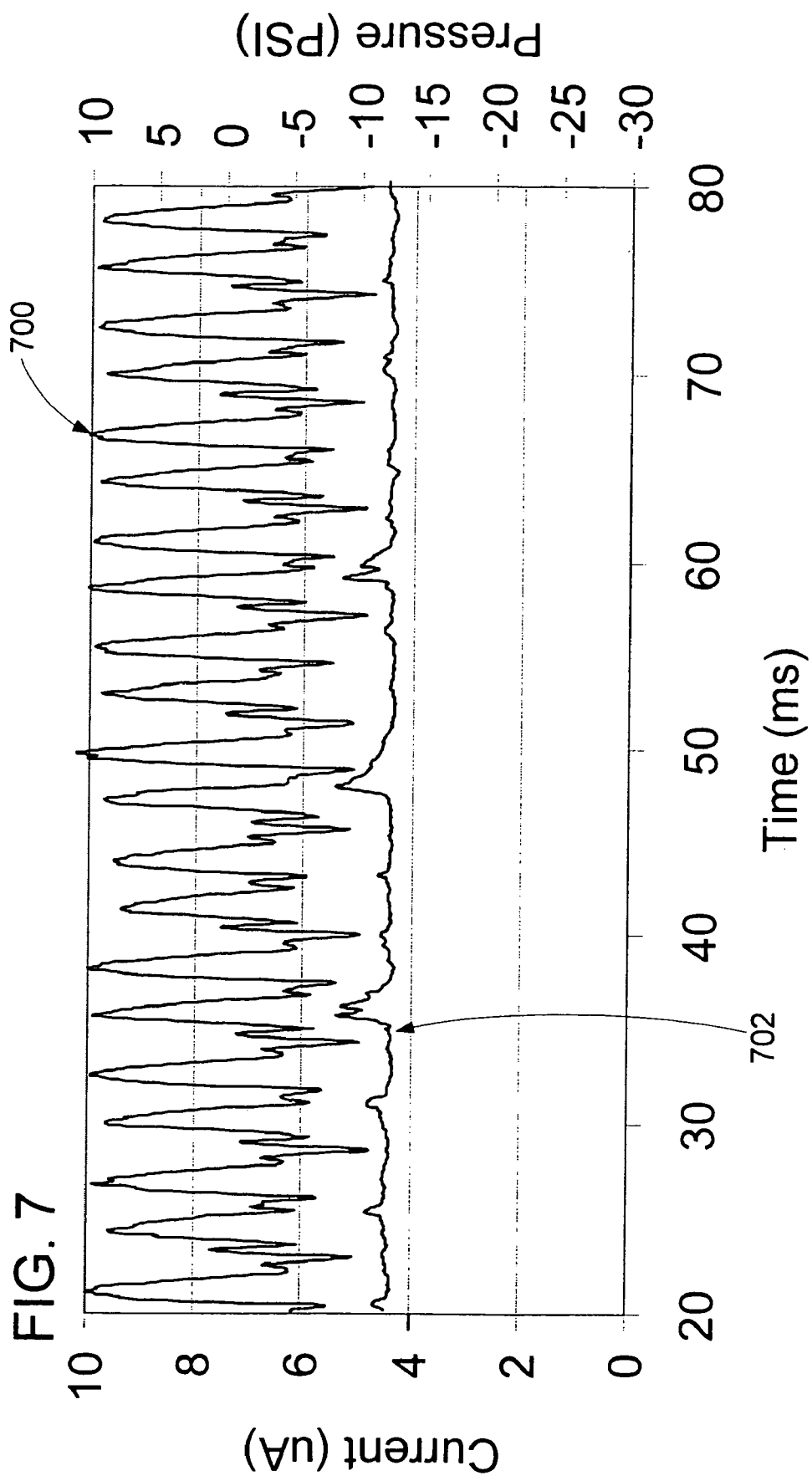
FIG. 7 is a graphical illustration of the output of a pressure sensor and ion current illustrating that ion current oscillations correspond to pressure oscillations in a combustion chamber.
Figure 8:
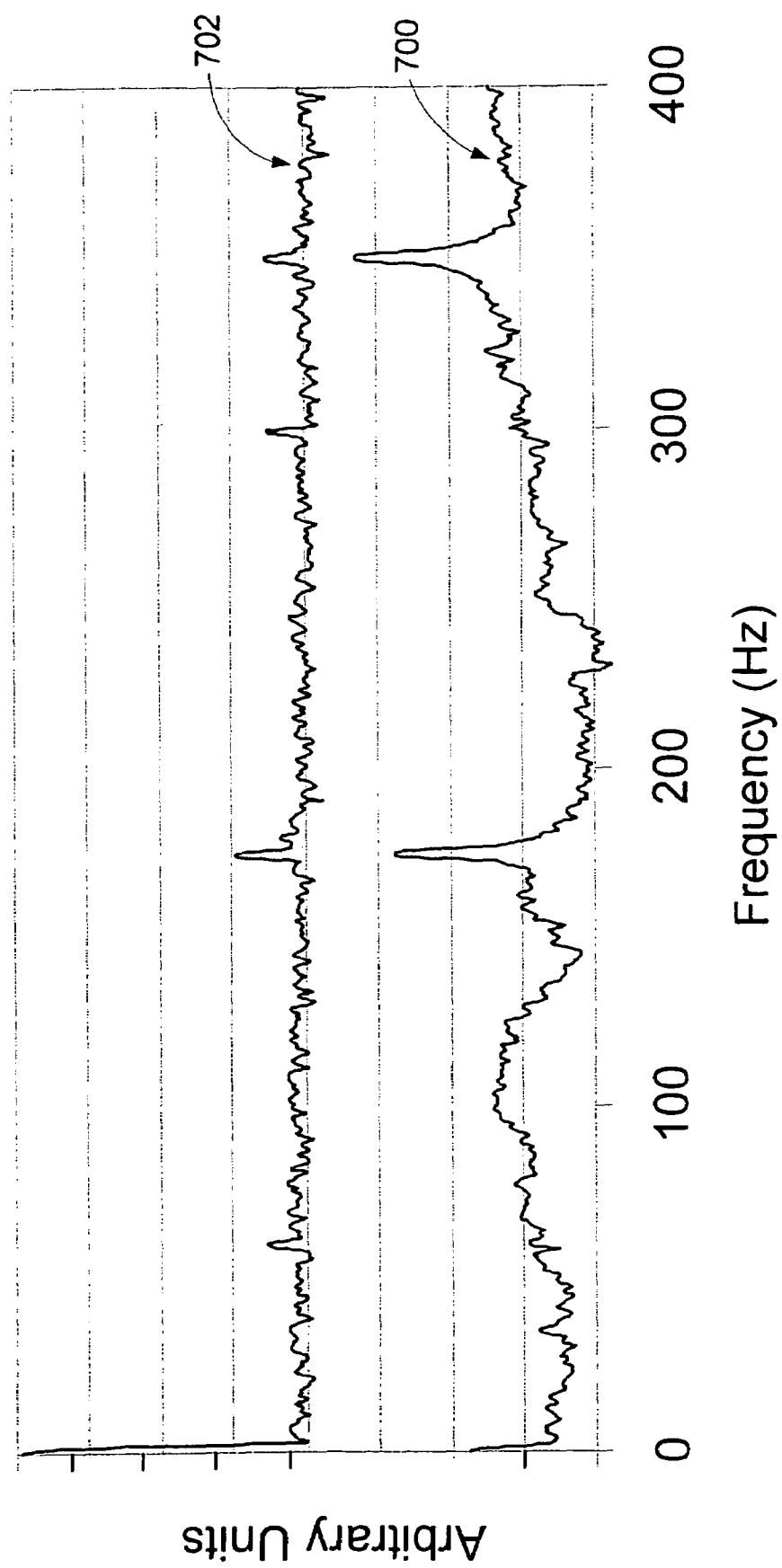
FIG. 8 is a diagram illustrating that the dominant frequencies of ion current oscillations track surges in pressure oscillations in a combustion chamber.

Once the flame 140 begins to oscillate, the ionization field surrounding the flame will also oscillate. The electronic module 102 senses the oscillation and takes appropriate action if the oscillation magnitude and frequency are above threshold levels as described herein. Turning now to FIG. 7, the oscillations in pressure and in ion current are shown. In FIG. 7, curve 700 illustrates a pressure oscillation from a pressure sensor mounted in a combustion chamber having an igniter 300 used as an ion sensor. Curve 702 is the ion current flowing through electrode 302. It can be seen that the ion current can provide a direct indication of pressure oscillations in the combustion chamber. FIG. 8, which is a fast Fourier transformation (FFT) of FIG. 7, illustrates that the dominant frequencies of the ion current 702 tracks the dominant frequencies of pressure 700 over various operating conditions in the combustion chamber 106.

When the flame 140 becomes unstable, it will typically exhibit pressure oscillations ranging in frequency from a few Hz to a few hundred Hz and higher. Oscillations with amplitudes as low as ±1 psi are capable of producing audible noise that cannot be tolerated in some cases. In addition to noise, the pressure oscillation waves can create mechanical stress in the system, leading to premature failure and even catastrophic failure. The combustion chamber liner and turbine blades (not shown) are most susceptible to high fatigue stress caused by combustion oscillations.

Figure 9:
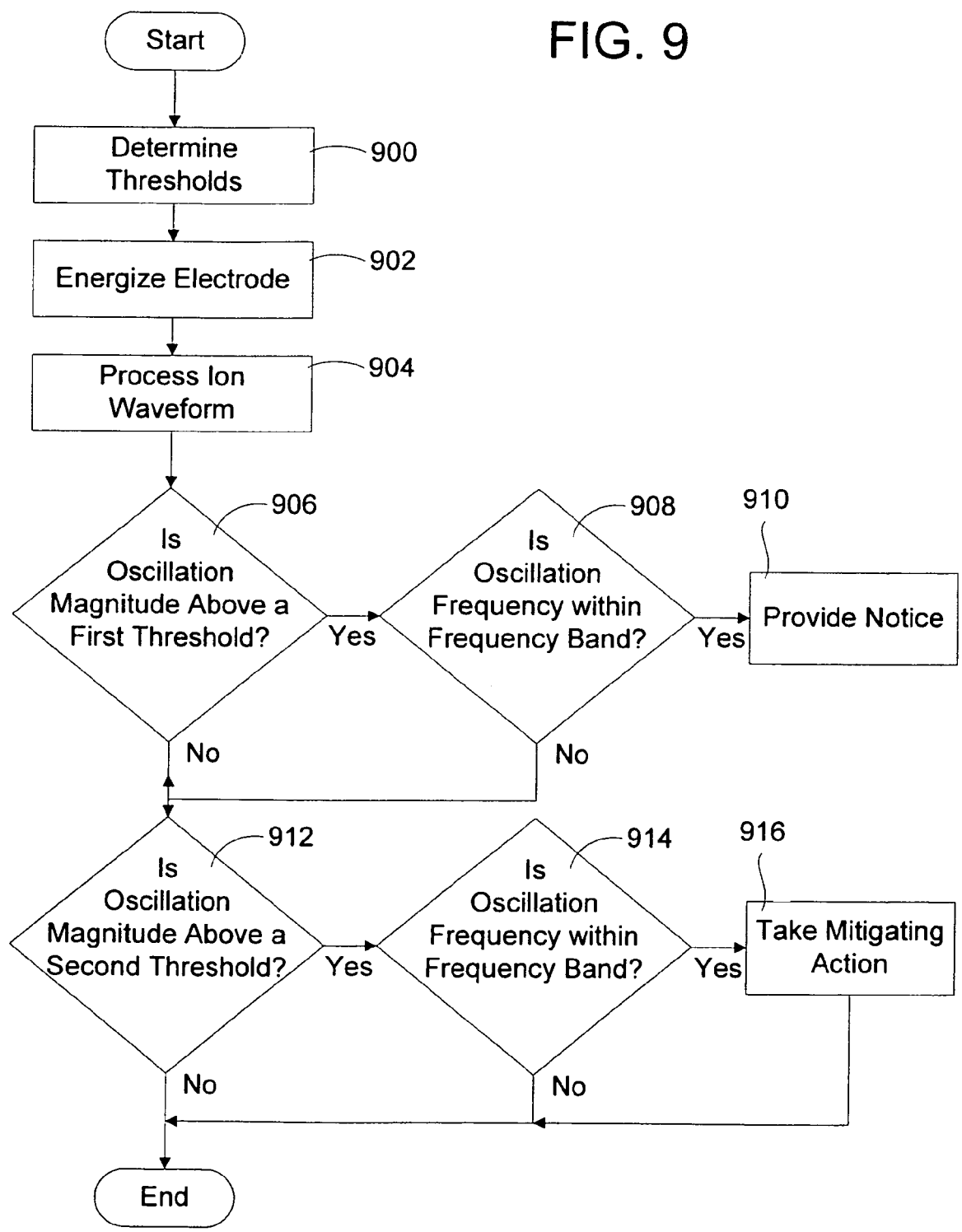
FIG. 9 is a flow chart illustrating the steps the present invention performs in tracking the onset of combustion instability or combustion instability in accordance with the present invention.

Turning now to FIG. 9, the steps the electronic module 102 performs in detecting the onset of combustion instability is illustrated. Setpoints (i.e., thresholds) are determined by an operator and are stored in an engine control module or other control module such as an ignition control module (step 900). The setpoints include oscillation magnitude and frequency thresholds that the control module is to detect. For example, the thresholds could be for the onset of combustion instability, a shut down level (e.g., destructive combustion instability), etc. For purposes of explanation, two thresholds will be used. Those skilled in the art recognize that any number of thresholds may be used. The thresholds used for explanation are a first threshold and a second threshold. The first threshold is for the onset of combustion instability where the oscillation frequency and magnitude are in a region where control parameters can be changed to move the combustion system operation away from the unstable range. The second threshold is for conditions where emergency actions must be performed such as reducing the power or shutdown the system to protect the system because further operation can lead to serious mechanical failure.

The electrode 302 is energized at the appropriate point in the cycle (step 902). Typically, the electrode 302 is energized after (or when) the fuel/air mixture is ignited. Electronic module 102 receives the ion waveform and processes the waveform (step 904). The waveform processing includes detecting if there is any oscillation in the waveform. If there is oscillation, the magnitude and frequency of oscillation is determined. If the oscillation magnitude is above the first threshold and below the second threshold (step 906), the frequency is checked to determine if it is within the frequency band setpoint for the first threshold (step 908). If the oscillation frequency is within the frequency band, a notice is sent to the engine control module so that control parameters can be changed such that the turbine operates further away from the point of combustion instability (step 910). It should be noted that the sequence of checking magnitude first and then frequency is arbitrary and the frequency may be examined first and then the magnitude or both may be checked simultaneously.

If the oscillation exists, the module 102 determines if the oscillation magnitude is above the second threshold level (step 912). If the oscillation magnitude is above the second threshold, the module determines if the frequency is within the frequency band setpoint for the second threshold (step 914). If the oscillation frequency is within the frequency band, an alarm is sent so that appropriate action can be taken such as shutting down the combustion system or derating the system output to avoid damage to the combustion system (step 916). In some continuous combustion systems, the notice and/or alarm is sent if the magnitude is above the threshold or the frequency is within the frequency band.

Figure 10:
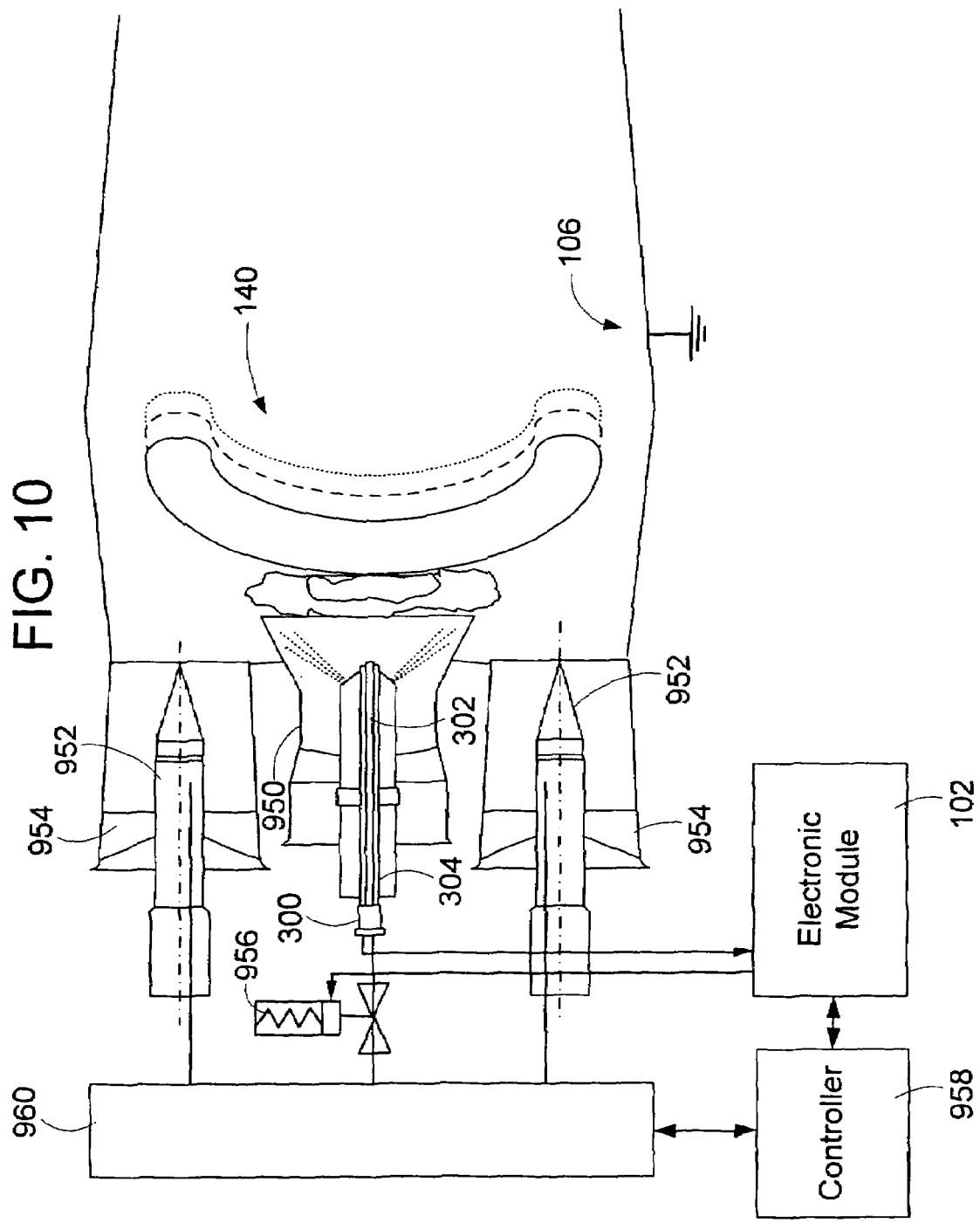
FIG. 10 is a diagram illustrating the components of FIG. 1 in a turbine environment operating in a closed loop mode to detect combustion instability.

In response to receiving the signal, a mitigating action is taken such as enriching the air/fuel ratio, adjusting the flow nozzle geometry, or other type of mitigating action. In one embodiment, an individual trim function is provided to each pilot nozzle of the engine to provide the mitigating action of enriching the air/fuel ratio. Turning now to FIG. 10, the pilot nozzle 950 is located at the centerline of the combustor 106 surrounded by main fuel nozzles 952. The main nozzles 952 have air swirlers 954 that mix air with the injected fuel such that the resulting mixture is nearly homogenous. Over 90% of the total fuel is admitted through the main nozzles 952 in a premixed fashion, but the mixture is typically too lean to sustain stable combustion. The pilot nozzle 950 admits up to 10% of the total fuel without being premixed with air. This pilot fuel burns quickly in a diffusion flame at much higher temperature than the lean premixed flame and tends to stabilize and anchor the entire flame at a desired location in the combustion chamber 106. A trim valve 956 is placed in the fuel line to the pilot nozzle 950 to adjust fuel flow and each trim valve is controlled by electronic module 102. The trim valve 956 is of limited authority, meaning that it only has the ability to affect some small portion of the total flow in the pilot fuel circuit. The main control of the pilot stage is handled by controller 958 via a pilot stage fuel control valve located in the fuel skid 960. For purposes of explanation, the trim valve 956 will have a range of adjustment of 10% of the pilot fuel flow from each pilot nozzle 950. It is recognized that other ranges may be used. The trim valve 956 will be set at the midpoint of its adjustment range, 95%. This means that the trim valve 956 has the ability to raise the pilot fuel flow to a given nozzle to 100% of available flow or lower the pilot fuel flow to a given nozzle to as low as 90% of available flow.

During operation, electronic module 102 receives the ion waveform from electrode 302 and processes the ion waveform to determine if combustion oscillations are of such magnitude or are in a frequency range such that mitigating action must be taken to protect the engine or improve combustor performance. If mitigating action must be taken, the electronic module 102 determines if the proper mitigating action is to increase the quantity of pilot fuel to the single combustor experiencing instability or to every combustor. In most situations, the pilot fuel to the single combustor experiencing instability will be adjusted. The module 102 obtains permission from the engine controller 958 to increase pilot fuel quantity. The main engine control 958 grants permission based on predetermined rules. The module 102 drives the trim valve 956 to open a predetermined amount. In one embodiment, the predetermined amount is 1% of flow. The additional pilot fuel flow raises the overall air/fuel ratio and causes the flame to burn slightly hotter, thereby becoming more stable, but at the expense of producing more $NO_x$ emissions. The electronic module 102 waits for a period of time to determine if the flame stability is adequately stable by comparing the ion signal to the thresholds. If the flame has not yet achieved adequate stability as determined by the thresholds, the trim valve 956 is commanded to allow more fuel to flow. For example, the trim valve is opened an additional 1% to 97%. The additional pilot fuel flow raises the overall air/fuel ratio and causes the flame to burn slightly hotter. This process is repeated until the electronic module 102 determines that the flame is adequately stable (i.e., within the limits of normal combustion), and no further action is required. This process generally results in the minimum amount of pilot fuel being used. If the trim valve setting reaches an upper limit, the electronic module 102 sends a notice to engine controller 958 to take other action such as adding more fuel to the system via the main nozzles 952, shutting the system off, etc. The electronic module 102 monitors the flame and makes a determination of stability on a recurring basis. Once the flame is shown to be stable, the controller 958 goes through a periodic test to determine how much excess pilot fuel is being used. The controller commands electronic module 102 to command the trim valve to restrict the pilot fuel flow by a predetermined amount. The resulting air/fuel ratio will become leaner, and the flame temperature will be reduced. The electronic module 102 measures the ion signal oscillations and compares the magnitude and frequency against the thresholds. If the flame is still within the stable range, the process is repeated until the threshold of stability is achieved. The electronic module 102 continues to check for combustion instability as described above.

Any malfunction of the stability control system only affects combustion performance by the limited amount of control range of the trim valve 956. Most control is still retained via the pilot control valve in the fuel skid 960. The safest failure mode for the trim valve 956 is full open, which will likely result in excessive pilot fuel. This will produce excess $NO_x$ emissions, but will likely not damage the combustor by pressure oscillations or excessive high combustion temperatures. While the electronic module 102 is manipulating the trim valve of a single nozzle in a single combustor, the remaining pilot nozzles of the other combustors are largely unaffected. This allows all combustors to be maintained in an optimum manner for flame stability, efficiency, and emissions. Those skilled in the art will recognize that a trim valve on the pilot nozzle is only one possible technique for closed loop control of combustion instability. For example, another technique is using a variable geometry nozzle, where the shape of the premixer is changed to create a different fuel-air distribution.

It can therefore be seen that a method and apparatus to detect combustion instability has been described. The need for a pressure sensor to sense combustion instability is eliminated using the present invention. Life-time maintenance costs of the turbine system is reduced with the elimination of the pressure sensor. The control components may be separately housed or be integrated into existing turbine control modules.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for detecting combustion instability in a continuous combustion system having a combustion region comprising:
    at least one retractable igniter having at least one electrode, the at least one retractable igniter positioned at a location in the continuous combustion system such that the at least one electrode is exposed to gases in the combustion region; and
    a controller coupled to the at least one electrode, the controller capable of receiving from the at least one electrode a combustion ionization signal and detecting an oscillation in the combustion ionization signal indicative of the occurrence of combustion instability.

2. The system of claim 1 wherein the controller is adapted to monitor a temperature of the at least one retractable igniter and actively position the at least one retractable igniter to take ion measurements and retract the at least one retractable igniter if the temperature is above a threshold.

3. The system of claim 2 wherein the controller is further adapted to retract the at least one retractable igniter if the temperature is rapidly approaching the threshold.

4. The system of claim 1 wherein the controller is adapted to position the retractable igniter to keep the retractable igniter exposed to gases in the combustion region and below a temperature threshold.

5. The system of claim 1 wherein the controller is adapted to excite the at least one electrode to create an electric field from the at least one electrode to a ground of the combustion region.

6. A system for detecting combustion instability in a continuous combustion system having a combustion region comprising:
    at least one retractable igniter having at least one electrode, the at least one retractable igniter positioned at a location such that the at least one electrode is exposed to gases in the combustion region, the at least one retractable igniter being retractable during operation of the continuous combustion system; and
    a controller coupled to the at least one electrode, the controller capable of receiving from the at least one electrode a combustion ionization signal and detecting an oscillation in the combustion ionization signal indicative of the occurrence of combustion instability.

7. The system of claim 6 wherein the controller is adapted to monitor a temperature of the at least one retractable igniter and actively position the at least one retractable igniter to take ion measurements and retract the at least one retractable igniter if the temperature is above a threshold.

8. The system of claim 7 wherein the controller is further adapted to retract the at least one retractable igniter if the temperature is rapidly approaching the threshold.

9. The system of claim 6 wherein the controller is adapted to position the retractable igniter to keep the retractable igniter exposed to gases in the combustion region and below a temperature threshold.

10. The system of claim 6 wherein the controller is adapted to excite the at least one electrode to create an electric field from the at least one electrode to a ground of the combustion region.

11. A method for detecting combustion instability in a lean premix gas turbine having a combustion chamber and an electrode positioned in the combustion chamber at a location such that the electrode is exposed to combustion gases containing free ions in the combustion chamber, the method comprising the steps of:
    applying a voltage to the electrode during the combustion process;
    determining parameters of a current flowing between the electrode and at least one wall of the combustion chamber of the lean premix gas turbine;
    determining if the parameters indicate the combustion process is one of at the onset of combustion instability or is unstable;
    adjusting at least one combustion system parameter if the parameters indicate the combustion process is one of at the onset of combustion instability or is unstable.

12. The method of claim 11 wherein the step determining if the parameters indicate the combustion process is one of at the onset of combustion instability or is unstable comprises determining that the combustion process is at the onset of combustion instability if an oscillation frequency is within a predetermined frequency range and an oscillation magnitude corresponds to a first threshold.

13. The method of claim 12 wherein the first threshold corresponds to±1 psi.

14. The method of claim 12 wherein the predetermined frequency range is approximately±50 Hz of a critical frequency of the gas turbine.

15. The method of claim 12 wherein the predetermined frequency range is between approximately 10 Hz and approximately 10 kHz.

16. The method of claim 12 wherein the step of determining if the parameters indicate the combustion process is one of at the onset of combustion instability or is unstable comprises determining that the combustion process is unstable if an oscillation frequency is within the audible frequency range and an oscillation magnitude corresponds to at least a second threshold.

* * * * *